United States Patent
Ichien et al.

(10) Patent No.: US 11,418,075 B2
(45) Date of Patent: Aug. 16, 2022

(54) ROTOR, MOTOR, AND ELECTRIC POWER STEERING DEVICE

(71) Applicant: Nidec Corporation, Kyoto (JP)

(72) Inventors: Akira Ichien, Kyoto (JP); Hideyuki Kinjo, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 134 days.

(21) Appl. No.: 17/040,568

(22) PCT Filed: Mar. 29, 2019

(86) PCT No.: PCT/JP2019/013936
§ 371 (c)(1),
(2) Date: Sep. 23, 2020

(87) PCT Pub. No.: WO2019/189729
PCT Pub. Date: Oct. 3, 2019

(65) Prior Publication Data
US 2021/0075279 A1 Mar. 11, 2021

(30) Foreign Application Priority Data
Mar. 30, 2018 (JP) .............................. JP2018-068031

(51) Int. Cl.
*H02K 1/27* (2022.01)
*H02K 1/28* (2006.01)
(Continued)

(52) U.S. Cl.
CPC ............... *H02K 1/278* (2013.01); *H02K 1/28* (2013.01); *H02K 21/14* (2013.01); *B62D 5/064* (2013.01); *H02K 29/03* (2013.01)

(58) Field of Classification Search
CPC .......... H02K 1/278; H02K 1/28; H02K 21/14; H02K 29/03; B62D 5/064
See application file for complete search history.

(56) References Cited

U.S. PATENT DOCUMENTS

| 2002/0125780 A1 | 9/2002 | Shiratori |
| 2013/0119808 A1* | 5/2013 | Hirokawa ............ H02K 1/2773 310/156.43 |

(Continued)

FOREIGN PATENT DOCUMENTS

| JP | 2004-023864 A | 1/2004 |
| JP | 2011-135735 A | 7/2011 |

(Continued)

OTHER PUBLICATIONS

Official Communication issued in International Patent Application No. PCT/JP2019/013936, dated Jun. 18, 2019.

*Primary Examiner* — Thomas Truong
(74) *Attorney, Agent, or Firm* — Keating & Bennett (57) ABSTRACT

A rotor includes a shaft, a rotor core, magnets on a radial outside surface of the rotor core, and sheet-shaped magnetic portions provided on radial outside surfaces of some of the magnets. The magnets include first magnets in which the magnetic portions are on a circumferential portion in a radial outside surface of the first magnets and second magnets in which the magnetic portions are not on a radial outside surface of the second magnets. The first magnets and the second magnets are alternately arranged in the circumferential direction in each of a first portion and a second portion along the axial direction in the radial outside surface of the rotor core. The first magnets of the first portion and the second magnets of the second portion overlap each other, and the second magnets of the first portion and the first magnets of the second portion overlap each other.

16 Claims, 9 Drawing Sheets

(51) Int. Cl.
*H02K 1/278* (2022.01)
*H02K 21/14* (2006.01)
*B62D 5/06* (2006.01)
*H02K 29/03* (2006.01)

(56) References Cited

U.S. PATENT DOCUMENTS

2015/0357892 A1 12/2015 Nakano et al.
2016/0322873 A1* 11/2016 Udo ...................... H02K 1/278

FOREIGN PATENT DOCUMENTS

JP 5414887 B2 2/2014
JP 2017-079596 A 4/2017

* cited by examiner

ROTOR, MOTOR, AND ELECTRIC POWER STEERING DEVICE

CROSS REFERENCE TO RELATED APPLICATIONS

This is a U.S. national stage of PCT Application No. PCT/JP2019/013936, filed on Mar. 29, 2019, and priority under 35 U.S.C. § 119(a) and 35 U.S.C. § 365(b) is claimed from Japanese Application No. 2018-068031, filed Mar. 30, 2018; the entire disclosures of each application are hereby incorporated herein by reference.

1. FIELD OF THE INVENTION

The present disclosure relates to a rotor, a motor, and an electric power steering device.

2. BACKGROUND

Typically, a motor includes a rotor and a stator. The rotor includes at least one magnet. To reduce a vibration and a noise generated by the motor, it is necessary to reduce both a cogging torque and a torque ripple.

Conventional motors reduce the cogging torque by providing protrusions or skews that generate phase inversion. For example, Japanese Patent No. 5414887 discloses the skew. The torque ripple is reduced by increasing a sine wave ratio of an induced voltage.

SUMMARY

A countermeasure for the cogging torque is generally devised in such a manner as to apply a skew to generate an opposite phase. However, there is a problem in that the application of the skew causes a reduction in torque. Additionally, the cogging torque and the torque ripple have a trade-off relationship with respect to a skew angle, and both the cogging torque and the torque ripple are hardly reduced.

In view of the above circumstances, example embodiments of the present disclosure provide rotors, motors, and electric power steering devices, each capable of reducing cogging torque while preventing reduction in torque and reducing torque ripple.

According to one example embodiment of the present disclosure, a rotor includes a shaft with a center axis, a rotor core fixed to the shaft, magnets circumferentially and axially arrayed on a radial outside surface of the rotor core, and sheet-shaped magnetic portions provided on radial outside surfaces of a predetermined plurality of magnets among the plurality of magnets. The magnets include first magnets with the magnetic portions being provided on at least a circumferential portion in a radial outside surface of the first magnets and second magnets in which none of the magnetic portions are on a radial outside surface of the second magnets, the first magnets and the second magnets being alternately provided in the circumferential direction in a first portion along the axial direction in the radial outside surface of the rotor core, the first magnets and the second magnets being alternately provided in the circumferential direction in a second portion different from the first portion along the axial direction in the radial outside surface of the rotor core, and when viewed in the axial direction, the first magnets of the first portion and the second magnets of the second portion overlap each other, and the second magnets of the first portion and the first magnets of the second portion overlap each other.

According to another example embodiment of the present disclosure, a motor includes the above-described rotor and a stator opposed to the rotor with a gap in a radial direction.

According to still another example embodiment of the present disclosure, an electric power steering device includes the above-described motor.

In the rotors, the motors, and the electric power steering devices of example embodiments of the present disclosure, the cogging torque is reduced while torque reduction is prevented and torque ripple is reduced.

The above and other elements, features, steps, characteristics and advantages of the present disclosure will become more apparent from the following detailed description of the example embodiments with reference to the attached drawings.

DETAILED DESCRIPTION

In the following description, a direction parallel to a center axis J, namely, a vertical direction is simply referred to as an "axial direction", a radial direction centered on the center axis J is simply referred to as a "radial direction", and a circumferential direction centered on the center axis J is simply referred to as a "circumferential direction". In the following example embodiment, an upper side (+Z) corresponds to one side in the axial direction, and a lower side (−Z) corresponds to the other side in the axial direction. The vertical direction, the upper side, and the lower side are merely names for describing a relative positional relationship between the respective units, and an actual layout relationship and the like may be other than the layout relationship indicated by these names.

Figure 1:
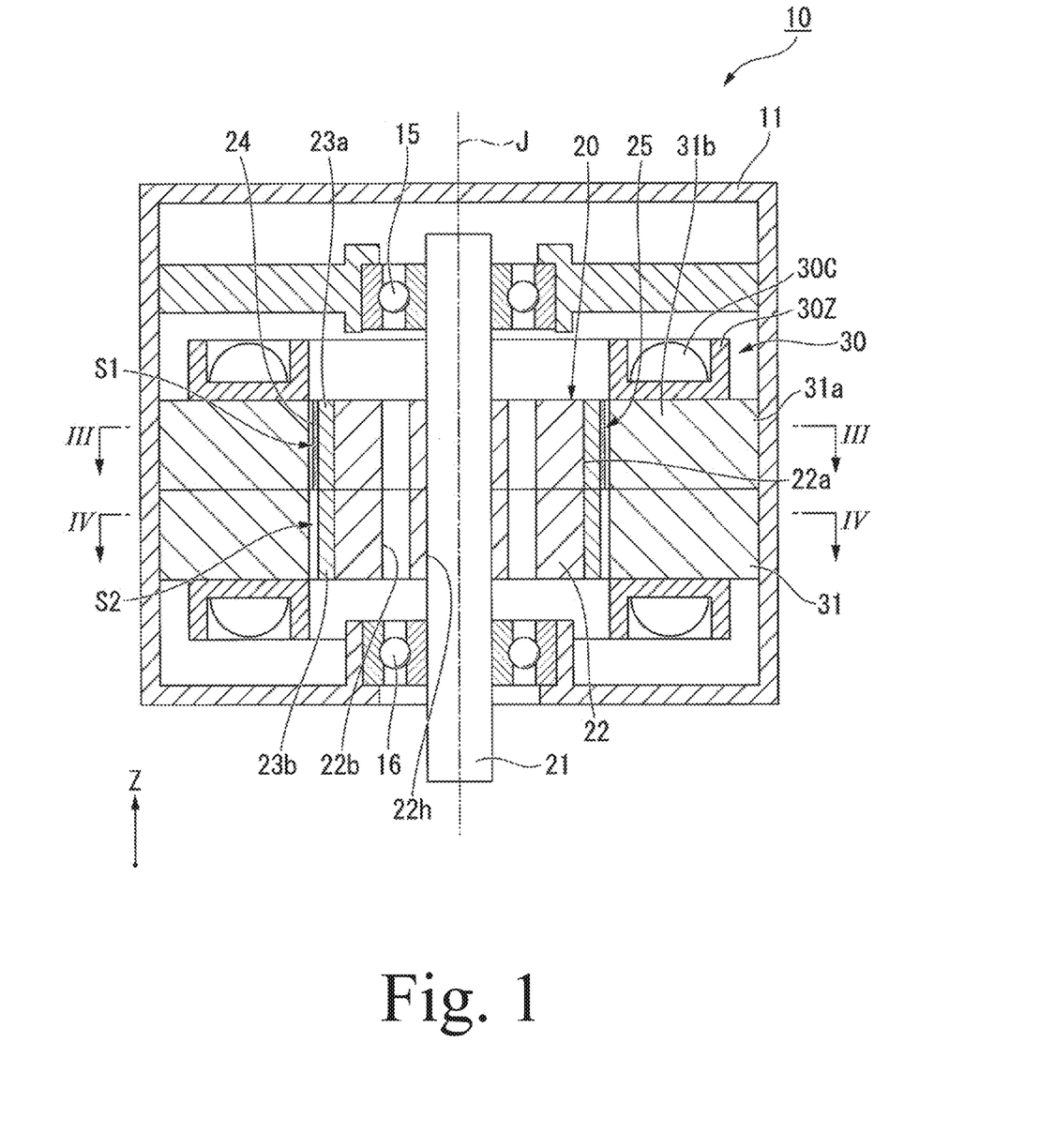
FIG. 1 is a schematic sectional view illustrating a rotor and a motor according to an example embodiment of the present disclosure.

As illustrated in FIG. 1, a motor 10 of the example embodiment includes a rotor 20, a stator 30, a housing 11, and a plurality of bearings 15, 16. As illustrated in FIGS. 1 to 4, the rotor 20 includes a shaft 21 having the center axis J, a rotor core 22, a plurality of magnets 23a, 23b, and a plurality of magnetic portions 24. The magnetic portion 24 is provided on a radial outside surface of a predetermined plurality of magnets 23a among the plurality of magnets 23a, 23b. The rotor 20 also includes a cover 25.

The shaft 21 extends vertically along the center axis J. In the example of the example embodiment, the shaft 21 has a columnar shape extending in the axial direction. The shaft 21 is supported by the plurality of bearings 15, 16 so as to be rotatable about the center axis J. The plurality of bearings 15, 16 are disposed at intervals in the axial direction, and are supported by the housing 11. The housing 11 has a tubular shape.

The shaft 21 is fixed to the rotor core 22 by press fitting, bonding, or the like. That is, the rotor core 22 is fixed to the shaft 21. The shaft 21 may be fixed to the rotor core 22 with a resin member or the like interposed therebetween. That is, the shaft 21 is directly or indirectly fixed to the rotor core 22. The shaft 21 is not limited to the above-mentioned cylindrical shape. For example, the shaft 21 may have a tubular shape.

For example, the rotor core 22 is a laminated steel sheet formed by laminating a plurality of electromagnetic steel sheets in the axial direction. The rotor core 22 has a tubular shape. The rotor core 22 has a polygonal outer shape when viewed in the axial direction. A radial outside surface of the rotor core 22 includes a plurality of flat surfaces 22a arranged in the circumferential direction. In the example of the example embodiment, the rotor core 22 has an octagonal outer shape. The radial outside surface of the rotor core 22 includes eight flat surfaces 22a arranged in the circumferential direction. The flat surface 22a has a flat shape extending in a direction perpendicular to the radial direction. The flat surface 22a extends in the axial direction in the radial outside surface of the rotor core 22. The flat surfaces 22a are arranged on the radial outside surface of the rotor core 22 over the entire length in the axial direction. In the example of the example embodiment, an axial length of the flat surface 22a is larger than a circumferential length.

The rotor core 22 includes a through-hole 22h, a hole 22b, and a groove 22c. When viewed in the axial direction, the through-hole 22h is disposed in a center portion of the rotor core 22. The through-hole 22h penetrates the rotor core 22 in the axial direction. The shaft 21 is inserted into the through-hole 22h.

The hole 22b penetrates the rotor core 22 in the axial direction. The plurality of holes 22b are made in the rotor core 22 at intervals in the circumferential direction. In the example of the example embodiment, the holes 22b are arranged in the rotor core 22 at equal intervals in the circumferential direction. When viewed in the axial direction, the hole 22b has a circular shape. In the example embodiment, the rotor core 22 is lightened by the hole 22b, so that weight reduction and cost reduction of a material of the rotor core 22 can be achieved.

The groove 22c is recessed radially inward from the radial outside surface of the rotor core 22, and extends in the axial direction. The groove 22c is disposed over the entire length in the axial direction on the radial outside surface of the rotor core 22. The groove 22c is disposed between a pair of flat surfaces 22a circumferentially adjacent to each other on the radial outside surface of the rotor core 22, and is open onto a radial outside. A plurality of grooves 22c are arranged on rotor core 22 at intervals in the circumferential direction. The grooves 22c are arranged on the rotor core 22 at equal intervals in the circumferential direction. A groove width of the groove 22c becomes smaller toward the radial outside. When viewed in the axial direction, the groove 22c has a wedge shape.

The magnets 23a, 23b are permanent magnets. A plurality of magnets 23a, 23b are circumferentially and axially arrayed on the radial outside surface of the rotor core 22. The magnets 23a, 23b are provided on the flat surface 22a. In the example of the example embodiment, the axially-arrayed magnets 23a, 23b are disposed without any gap in the axial direction. The circumferentially-arrayed magnets 23a, 23b are spaced from each other in the circumferential direction. A groove 22c is disposed between a pair of magnets 23a, 23b circumferentially adjacent to each other.

The magnets 23a, 23b have a plate shape. The magnets 23a, 23b have a rectangular plate shape. Plate surfaces of the magnets 23a, 23b face the radial direction. When viewed in the axial direction, the magnets 23a, 23b have a circumferential length longer than a radial length. Radial thicknesses of the magnets 23a, 23b increase from both ends in the circumferential direction toward the central side (circumferential inside).

When viewed in the axial direction, radial inside surfaces of the magnets 23a, 23b have a linear shape. The radial inside surfaces of the magnets 23a, 23b have a flat shape extending in the direction perpendicular to the radial direction. The radial inside surfaces of the magnets 23a, 23b contact with the flat surface 22a. When viewed in the axial direction, the radial outside surfaces of the magnets 23a, 23b have a convex curved shape. The radial outside surfaces of the magnets 23a, 23b have a curved shape convex to the radial outside when viewed in the axial direction.

The plurality of magnets 23a, 23b have a plurality of first magnets 23a and a plurality of second magnets 23b. In the first magnet 23a, the magnetic portion 24 is disposed on at least a circumferential portion of the radial outside surface of the magnet 23a. For example, the first magnet 23a can be referred to as an Interior Permanent Magnet (IPM). In the second magnet 23b, the magnetic portion 24 is not disposed on the radial outside surface of the magnet 23b. The radial outside surface of the second magnet 23b radially faces a tooth 31b (to be described later) of the stator 30. For example, the second magnet 23b can be referred to as a Surface Permanent Magnet (SPM).

The magnetic portion 24 is made of a magnetic material (ferromagnetic material) such as iron, stainless steel, and steel. The magnetic portion 24 has a sheet shape. The "sheet shape" of the example embodiment is a concept including a plate shape and a film shape. The sheet surface (plate surface, film surface) of the magnetic portion 24 faces the radial direction. When viewed in the axial direction, the radial inside surface of the magnetic portion 24 has a concave curved shape. The radial outside surface of the magnetic portion 24 has a curved surface concave to the radial outside when viewed in the axial direction. The radial inside side surface of the magnetic portion 24 contacts with the radial outside surface of the first magnet 23a. When viewed in the axial direction, the radial outside surface of the magnetic portion 24 has a convex curved shape. The radial outside surface of the magnetic portion 24 has a curved surface convex to the radial outside when viewed in the axial direction. The radial outside surface of the magnetic portion 24 radially faces a tooth 31b (to be described later) of the stator 30.

The magnetic portion 24 is disposed in a range of at least a half along the circumferential direction on the radial outside surface of the first magnet 23a. In the example embodiment, the magnetic portion 24 is disposed over a circumferential entire length on the radial outside surface of the first magnet 23a. For this reason, the first magnet 23a and the magnetic portion 24 can easily be aligned in the circumferential direction, which simplifies manufacturing. In particular, the circumferential entire length of the radial outside surface of the first magnet 23a and the circumferential entire length of the magnetic portion 24 are equal to each other. Both the ends in the circumferential direction of the first magnet 23a and both the ends in the circumferential direction of the magnetic portion 24 are disposed so as to overlap each other when viewed in the radial direction.

Both the ends in the circumferential direction of the first magnet 23a and both ends in the circumferential direction of the flat surface 22a are disposed so as to overlap each other when viewed in the radial direction. In the example of the example embodiment, circumferential positions at both the ends in the circumferential direction of the flat surface 22a are slightly disposed on the circumferential outside compared with circumferential positions at both the ends in the circumferential direction of the first magnet 23a. That is, the circumferential length of the flat surface 22a is longer than the circumferential length of the first magnet 23a.

Both the ends in the circumferential direction of the second magnet 23b and both ends in the circumferential direction of the flat surface 22a are disposed so as to overlap each other when viewed in the radial direction. In the example of the example embodiment, the circumferential positions at both the ends in the circumferential direction of the flat surface 22a are slightly disposed on the circumferential outside compared with the circumferential positions at both the ends in the circumferential direction of the second magnet 23b. That is, the circumferential length of the flat surface 22a is longer than the circumferential length of the second magnet 23b.

In the example embodiment, the first magnet 23a and the second magnet 23b have the same shape. The first magnet 23a and the second magnet 23b have the same circumferential length. The first magnet 23a and the second magnet 23b have the same radial thickness. The first magnet 23a and the second magnet 23b have the same volume. According to the example embodiment, components can be commonalized between the first magnet 23a and the second magnet 23b. Consequently, the effects (to be described later) of the example embodiment can more stably be obtained.

Figure 3:
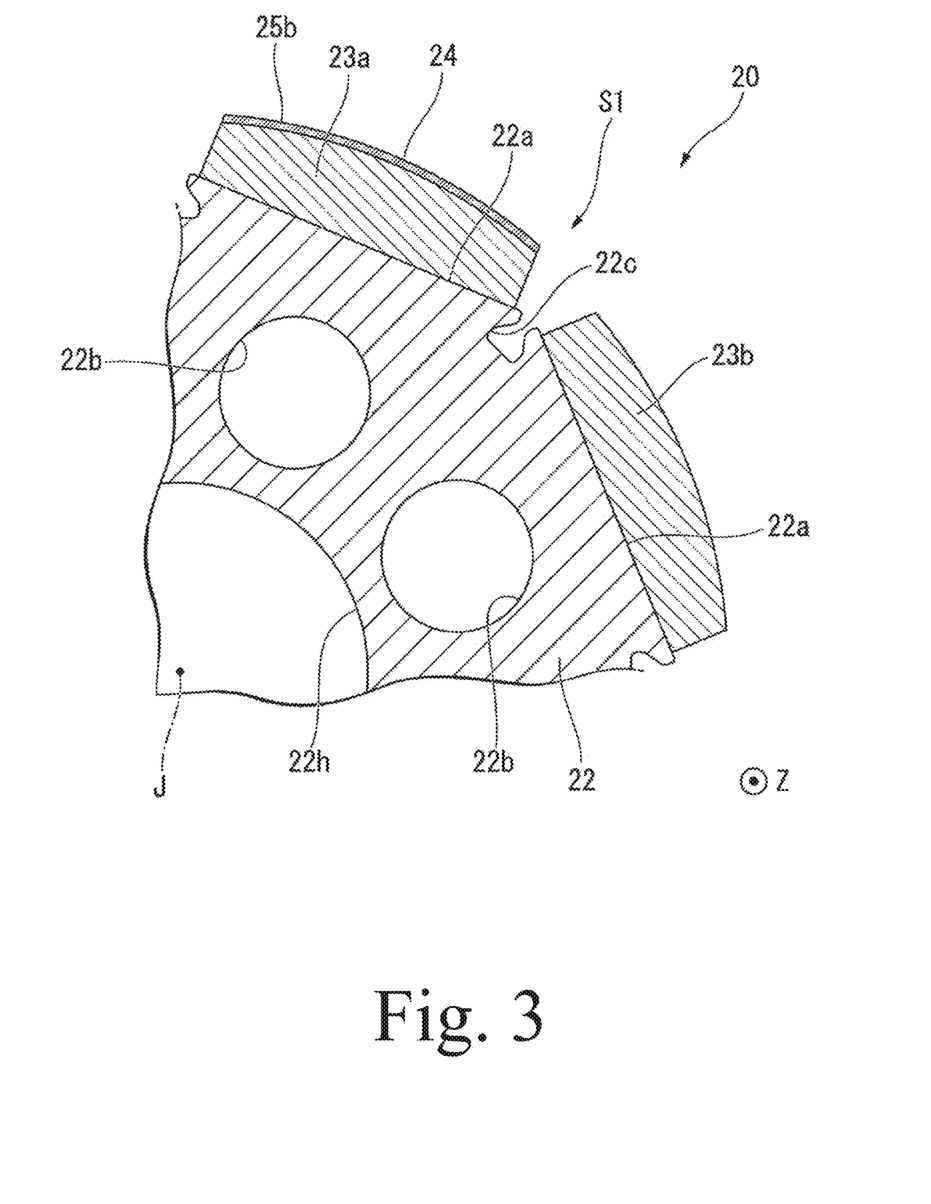
FIG. 3 is an enlarged sectional view illustrating a portion of a section taken along a line III-III in FIG. 1.
Figure 4:
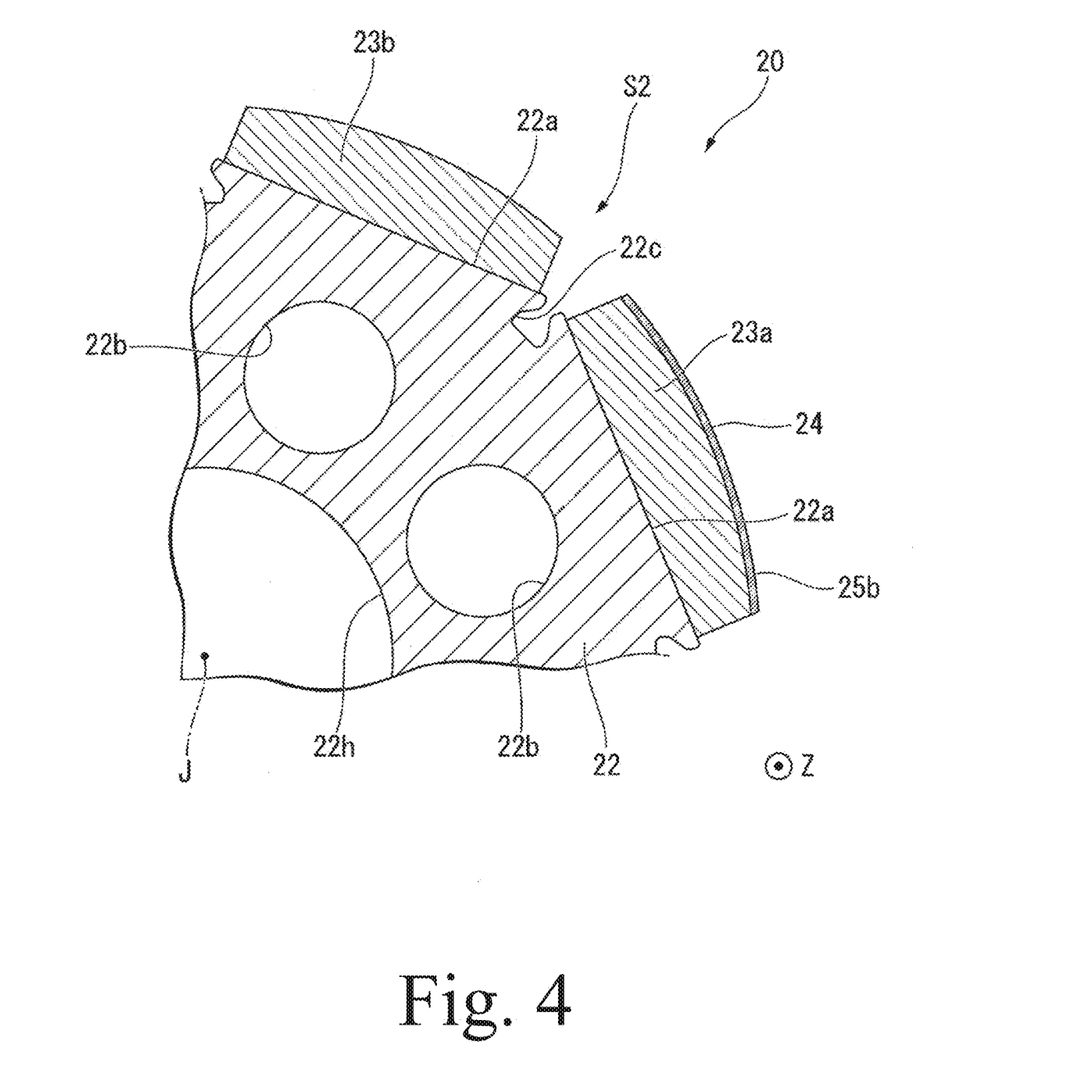
FIG. 4 is an enlarged sectional view illustrating a portion of a section taken along a line IV-IV in FIG. 1.

In a first portion (first step, first region) S1 along the axial direction on the radial outside surface of the rotor core 22, the first magnet 23a and the second magnet 23b are alternately disposed in the circumferential direction. In the first portion S1, the plurality of magnets 23a, 23b are circumferentially arranged at equal intervals on the radial outside surface of the rotor core 22. In a second portion (second step, second region) S2 different from the first portion S1 along the axial direction on the radial outside surface of the rotor core 22, the first magnet 23a and the second magnet 23b are alternately disposed in the circumferential direction. In the second portion S2, the plurality of magnets 23a, 23b are circumferentially arranged at equal intervals on the radial outside surface of the rotor core 22.

When viewed in the axial direction, the first magnet 23a of the first portion S1 and the second magnet 23b of the second portion S2 are disposed so as to overlap each other. When viewed in the axial direction, the second magnet 23b of the first portion S1 and the first magnet 23a of the second portion S2 are disposed so as to overlap each other. In the example embodiment, when viewed in the axial direction, the center portion in the circumferential direction of the first magnet 23a of the first portion S1 and the center portion in the circumferential direction of the second magnet 23b of the second portion S2 are disposed so as to overlap each other, and the center portion in the circumferential direction of the second magnet 23b of the first portion S1 and the center portion in the circumferential direction of the first magnet 23a of the second portion S2 are disposed so as to overlap each other. When viewed in the axial direction, both the ends in the circumferential direction of the first magnet 23a of the first portion S1 and both the ends in the circumferential direction of the second magnet 23b of the second portion S2 are disposed so as to overlap each other, and both the ends in the circumferential direction of the second magnet 23b of the first portion S1 and both the ends in the circumferential direction of the first magnet 23a of the second portion S2 are disposed so as to overlap each other. For this reason, the skew is not applied to the magnets 23a, 23b, and the magnets 23a and 23b are arrayed straight in the axial direction.

Figure 5:
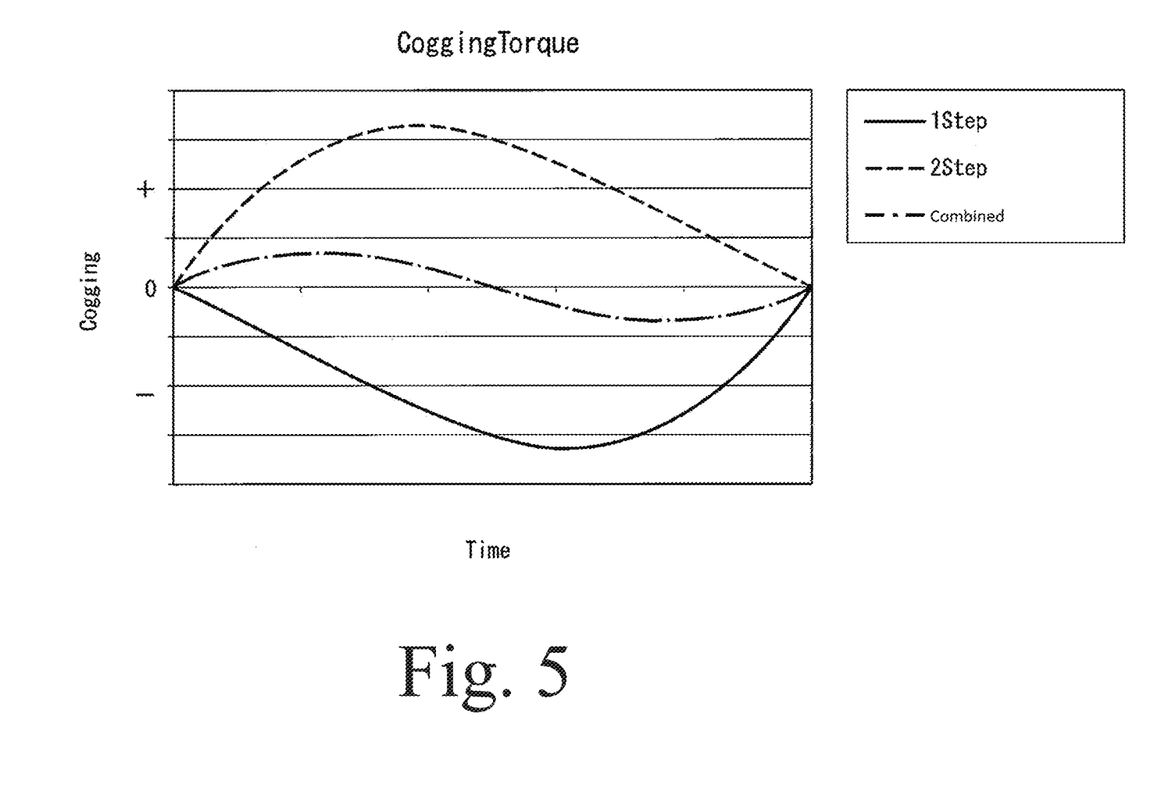
FIG. 5 is a graph illustrating a waveform of cogging torque of a motor according to an example embodiment of the present disclosure.
Figure 6:
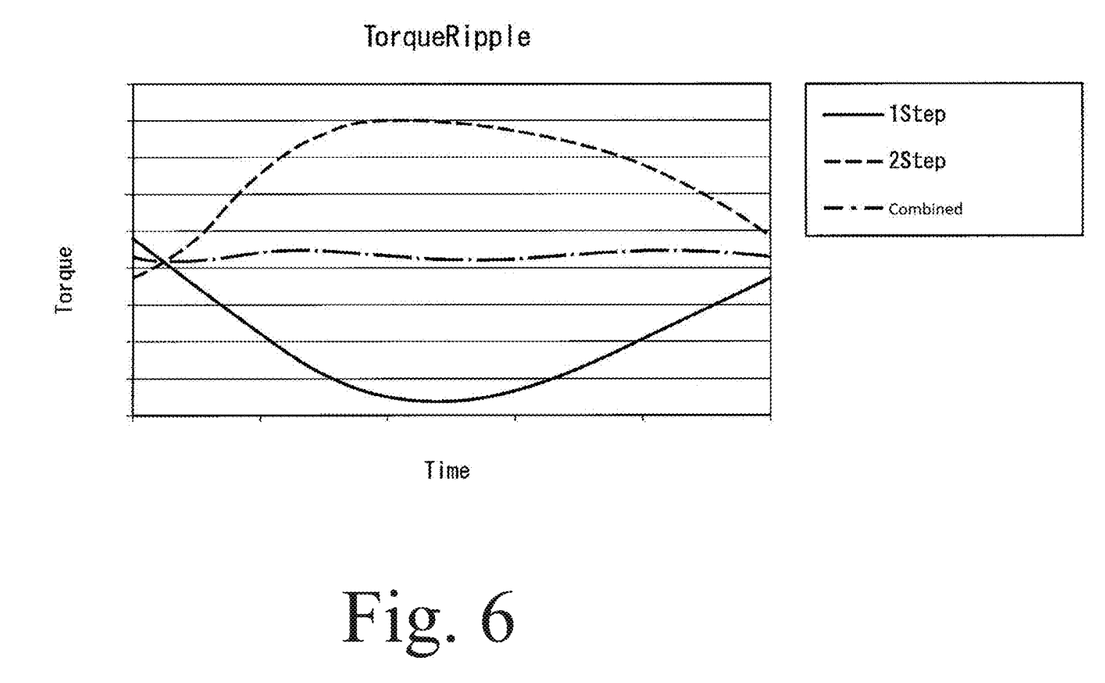
FIG. 6 is a graph illustrating a waveform of a torque ripple of a motor according to an example embodiment of the present disclosure.

FIG. 5 is a graph illustrating a cogging torque waveform of the motor 10 including the rotor 20 of the example embodiment. FIG. 6 is a graph illustrating a torque ripple waveform of the motor 10 of the example embodiment. Each of FIGS. 5 and 6 illustrates a waveform around an angle of 45°. As illustrated in FIG. 5 and FIG. 6, in the example embodiment, the opposite phase can be generated in the cogging torque without applying skew to the magnets 23a, 23b. That is, because the cogging torque generated in the first portion S1 and the cogging torque generated in the second portion S2 are generated with phases opposite to each other, the cogging torque generated in the first portion S1 and the cogging torque generated in the second portion S2 cancel each other, and a fluctuation range of a combined cogging torque waveform (a difference between a maximum value and a minimum value of the combined cogging torque) can be kept small. The opposite phase can be generated in the torque ripple. That is, because the torque ripple generated in the first portion S1 and the torque ripple generated in the second portion S2 are generated with phases opposite to each other, the torque ripple generated in the first portion S1 and the torque ripple generated in the second portion S2 cancel each other, and a fluctuation range of a combined torque ripple waveform (the difference between the maximum value and the minimum value of the combined torque ripple) can be kept small. Thus, in the example embodiment, the cogging torque can be reduced while the torque reduction is prevented, and the torque ripple can be reduced. The vibration and noise generated by the motor 10 can be reduced.

In the example of the present example embodiment, the first magnet 23a of the first portion S1 and the second magnet 23b of the second portion S2, which are axially arranged, are a portion of a single member. The second magnet 23b of the first portion S1 and the first magnet 23a of the second portion S2, which are axially arranged, are a portion of a single member. In particular, a magnet member extending over the entire length in the axial direction of the flat surface 22a is provided in each of the plurality of flat surfaces 22a on the radial outside surface of the rotor core 22. In the magnet member in which the first magnet 23a is disposed in the first portion S1 along the axial direction, the second magnet 23b is disposed in the second portion S2. That is, in this case, the first portion S1 of the magnet member corresponds to the first magnet 23a, and the second portion S2 of the magnet member corresponds to the second magnet 23b. In the magnet member in which the second magnet 23b is disposed in the first portion S1 along the axial direction, the first magnet 23a is disposed in the second portion S2. That is, in this case, the first portion S1 of the magnet member corresponds to the second magnet 23b, and the second portion S2 of the magnet member corresponds to the first magnet 23a. The plurality of magnet members are one type of magnet member. According to the example embodiment, the number of components can be decreased, which facilitates manufacturing.

In the example embodiment, the same numbers of first portions S1 and second portions S2 are alternately arranged in the axial direction on the radial outside surface of the rotor core 22. That is, the sum of the number of the first portions S1 and the number of the second portions S2 becomes an even number, and the first portions S1 and the second portions S2 are alternately arranged in the axial direction. Consequently, the above effect that can reduce the cogging torque and the torque ripple can more stably be obtained. In the example of the example embodiment, the first portion S1 and the second portion S2 are arranged in the axial direction on the radial outside surface of the rotor core 22. Thus, the above effect can be obtained with a simple structure.

Figure 2:
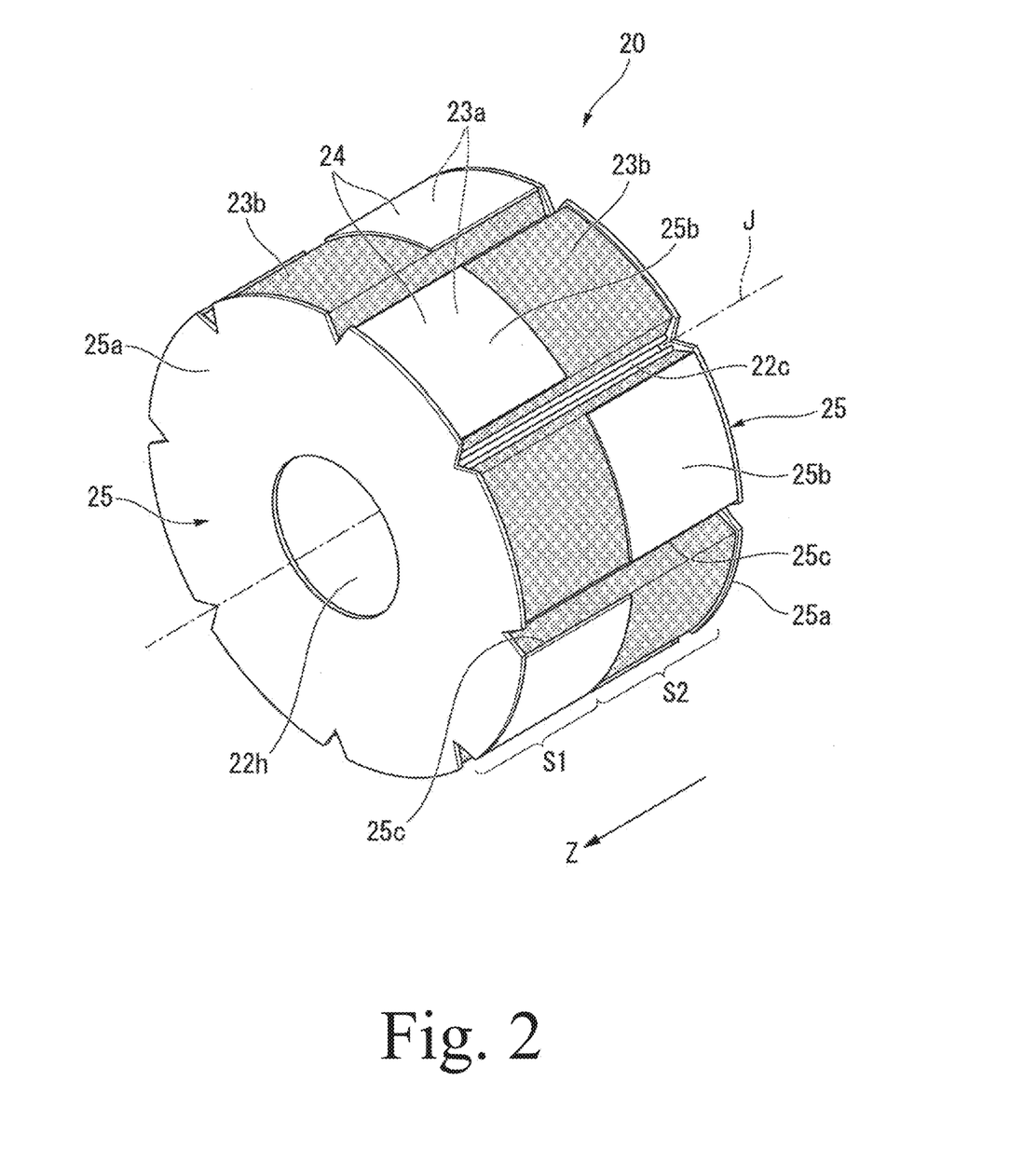
FIG. 2 is a perspective view of a rotor according to an example embodiment of the present disclosure.

As illustrated in FIG. 2, the cover 25 has a tubular shape with the center axis J as a center. The cover 25 has a substantially cylindrical shape. The cover 25 has a bottomed tubular shape (topped tubular shape). In the example of the example embodiment, the rotor 20 includes a pair of covers 25. The pair of covers 25 have the same shape. That is, the pair of covers 25 is one type of cover 25. The pair of covers 25 is attached to the rotor core 22 from both sides in the axial direction. One of the pair of covers 25 is attached to the rotor core 22 from one side (upper side) to the other side (lower side) in the axial direction. The other cover 25 is attached to the rotor core 22 from the other axial side toward one side. One of the covers 25 is located in the first portion S1. The other cover 25 is located in the second portion S2.

The cover 25 includes a bottom wall (top wall) 25a and a circumferential wall 25b. The bottom wall 25a has a disk shape with a plate surface that faces the axial direction. The bottom wall 25a is opposed to an end face of the rotor core 22 that faces the axial direction. The circumferential wall 25b extends axially from an outer periphery of the bottom wall 25a. The circumferential wall 25b includes a portion located on the radial outsides of the rotor core 22 and the magnet 23a. That is, the cover 25 includes a portion located on the radial outsides of the rotor core 22 and the magnet 23a. The circumferential wall 25b includes the plurality of magnetic portions 24 arranged in the circumferential direction and a plurality of openings 25c each of which is disposed between a pair of magnetic portions 24 circumferentially adjacent to each other. That is, the magnetic portion 24 is a part of the cover 25. In the example embodiment, the magnetic portion 24 is provided as a portion of the cover 25 that surrounds the rotor core 22 and the magnet 23a from the radial outside. For this reason, the magnetic portion 24 also has a function of pressing the first magnet 23a from the radial outside. That is, the magnetic portion 24 can prevent the first magnet 23a from moving onto the radial outside. Additionally, the plurality of magnetic portions 24 can simultaneously be disposed on the radial outside surface of the first magnet 23a, which facilitates manufacturing.

The opening 25c radially penetrates the circumferential wall 25b. In the example of the example embodiment, the opening 25c has a quadrangular shape when viewed in the radial direction. When viewed in the radial direction, the opening 25c includes a portion overlapping the groove 22c. That is, the groove 22c is exposed to the radial outside through the opening 25c.

Figure 7:
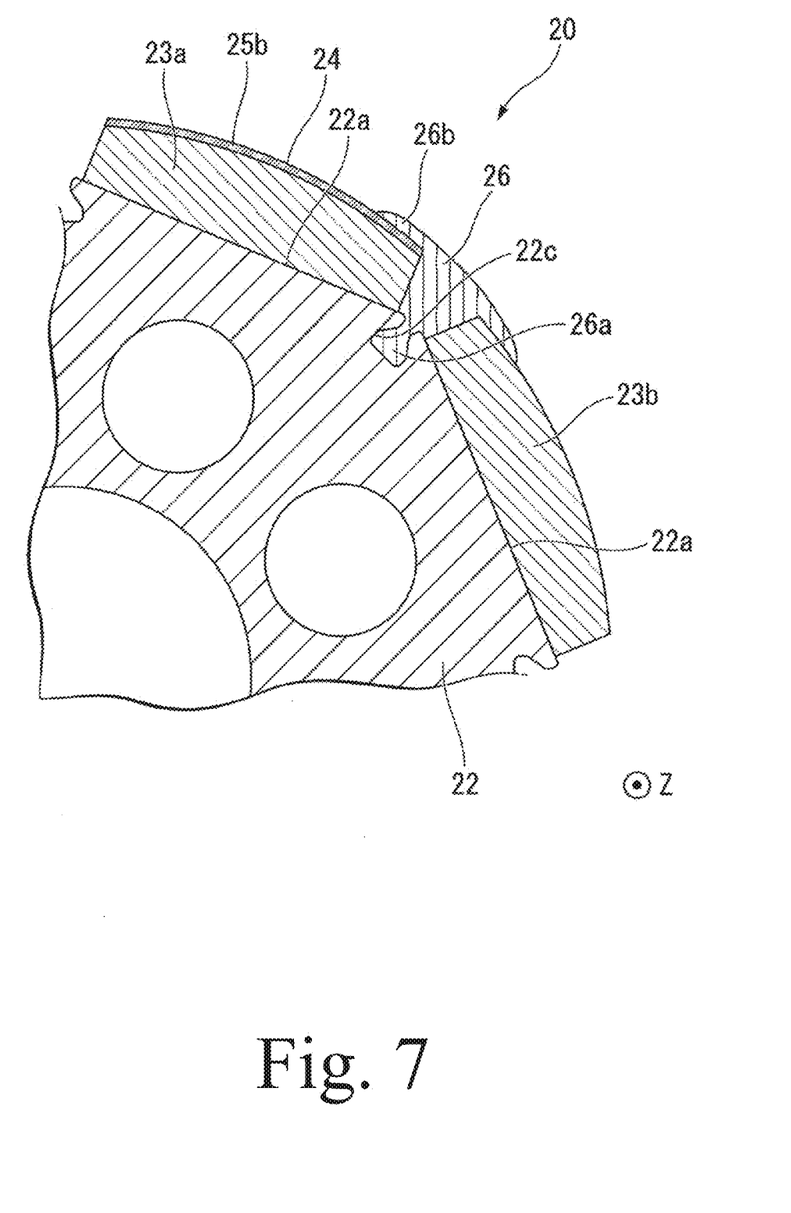
FIG. 7 is an enlarged sectional view illustrating a portion of a rotor according to a modification of an example embodiment of the present invention.

FIG. 7 illustrates a modification of the rotor 20 of the example embodiment. The rotor 20 includes a resin mold 26. The resin mold 26 is provided on the radial outside surface of the rotor core 22. A plurality of resin molds 26 are disposed at intervals in the circumferential direction on the radial outside surface of the rotor core 22. The resin mold 26 extends along the groove 22c. The resin mold 26 is formed by insert-molding and solidifying a molten resin together with the rotor core 22.

The resin mold 26 includes an anchor 26a and a movement prevention unit 26b. The groove 22c is filled with the molten resin and solidified, thereby forming the anchor 26a. The anchor 26a extends in the axial direction. A circumferential width of the anchor 26a increases toward the radial inside. The movement prevention unit 26b is located on the radial outside of the anchor 26a, and connected to the anchor 26a. The movement prevention unit 26b is disposed at the radial outside end of the resin mold 26. The movement prevention unit 26b protrudes from the anchor 26a toward both circumferential sides (one side and the other side). The movement prevention unit 26b has a plate shape in which a plate surface faces to the radial direction. The movement prevention unit 26b extends in the axial direction. The movement prevention unit 26b is disposed at a space from the flat surface 22a on the radial outside of the flat surface 22a. When viewed from the radial direction, the movement prevention unit 26b and the flat surface 22a are disposed so as to overlap each other.

After the resin mold 26 is formed, the magnets 23a, 23b (magnet members) are inserted between the flat surface 22a and the movement prevention unit 26b. For example, the magnets 23a, 23b are press-fitted between the flat surface 22a and the movement prevention unit 26b. After that, the rotor core 22 is covered with the cover 25 from the axial direction, and the circumferential wall 25b is fitted in the radial outside of the rotor core 22. At this point, the magnetic portion 24 is inserted between the magnet 23a and the movement prevention unit 26b. For example, the magnetic portion 24 is press-fitted between the magnet 23a and the movement prevention unit 26b. In the example embodiment, the resin mold 26 can function by providing the wedge-shaped groove 22c on the radial outside surface of the rotor core 22. That is, the resin mold 26 that is prevented from coming radially off from the groove 22c can be provided. The magnets 23a, 23b and the magnetic portion 24 can be pressed from the radial outside by the resin mold 26, and the magnets 23a, 23b and the magnetic portion 24 can be prevented from moving onto the radial outside.

As illustrated in FIG. 1, the stator 30 includes a stator core 31, an insulator 30Z, and a plurality of coils 30C. The stator core 31 has the annular shape centered on the center axis J. The stator core 31 surrounds the rotor 20 on the radial outside of the rotor 20. The stator core 31 is radially opposed to the rotor 20 with a gap interposed therebetween. That is, the stator 30 is radially opposed to the rotor 20 with the gap interposed therebetween. For example, the stator core 31 is formed of a laminated steel plate in which a plurality of electromagnetic steel plates are laminated in the axial direction.

Specifically, the stator core 31 includes a substantially annular core back 31a and a plurality of teeth 31b. In the example embodiment, the core back 31a has an annular shape centered on the center axis J. The tooth 31b extends from the radial inside surface of the core back 31a toward the radial inside. The outer circumferential surface of the core back 31a is fixed to the inner circumferential surface of a circumferential wall of the housing 11. The plurality of teeth 31b are arranged at intervals in the circumferential direction on the radial inside surface of the core back 31a. In the example embodiment, the teeth 31b are arranged at regular intervals in the circumferential direction.

The insulator 30Z is attached to the stator core 31. The insulator 30Z includes a portion covering the teeth 31b. For example, an insulating material such as a resin is used as a material for the insulator 30Z.

The coil 30C is attached to stator core 31. The plurality of coils 30C are attached to the stator core 31 with the insulator 30Z interposed therebetween. A conductive wire is wound around each tooth 31b with the insulator 30Z interposed therebetween, thereby forming the plurality of coils 30C.

An example of a device on which the motor 10 of the example embodiment is mounted will be described below. An example in which the motor 10 is mounted on an electric power steering device will be described in the example embodiment.

Figure 8:
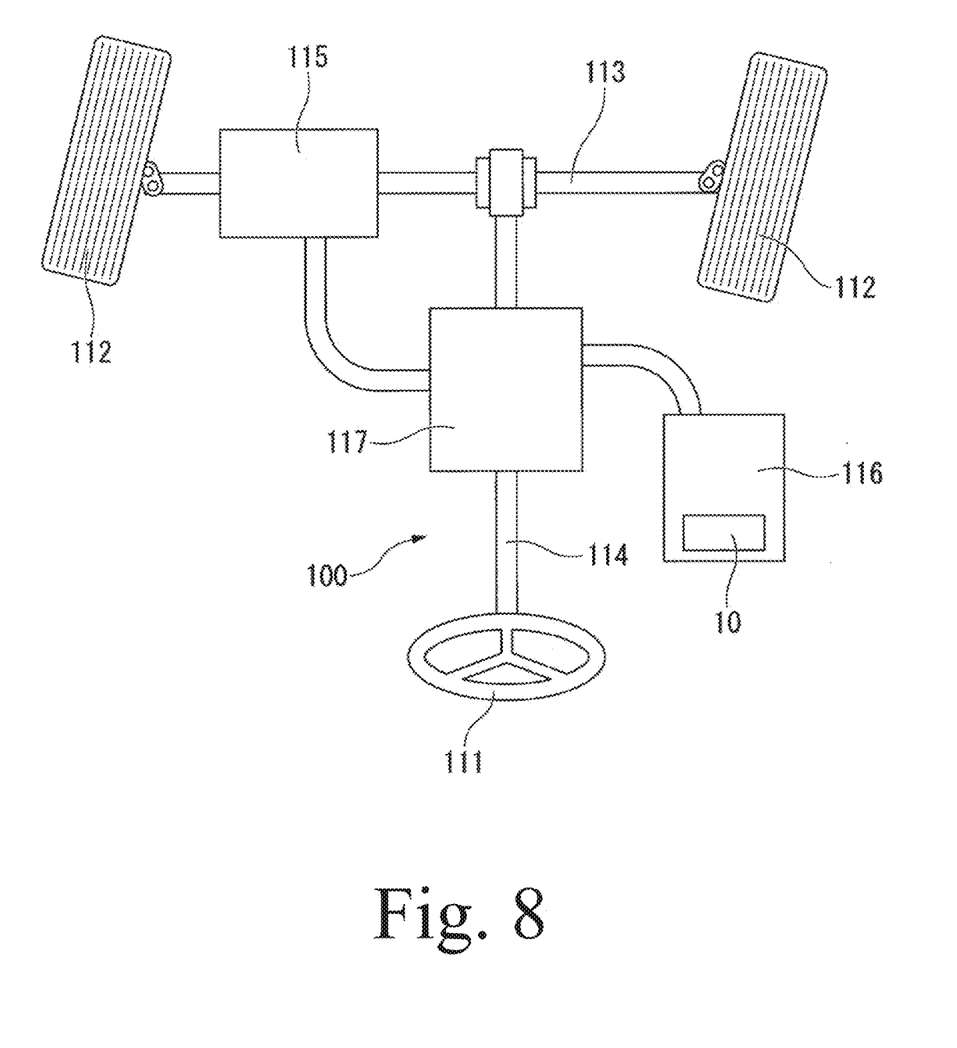
FIG. 8 is a schematic diagram illustrating an electric power steering device of an example embodiment of the present invention.

As illustrated in FIG. 8, an electric power steering device 100 is mounted on a steering mechanism of a wheel of an automobile. The electric power steering device 100 is a device that reduces steering force by a hydraulic pressure. The electric power steering device 100 of the example embodiment includes the motor 10, a steering axle 114, an oil pump 116, and a control valve 117.

The steering axle 114 transmits input from the steering 111 to an axle 113 including wheels 112. The oil pump 116 generates the hydraulic pressure in a power cylinder 115 that transmits driving force of the hydraulic pressure to the axle 113. The control valve 117 controls the oil of the oil pump 116. In the electric power steering device 100, the motor 10 is mounted as a drive source of the oil pump 116.

The electric power steering device 100 of the example embodiment includes the motor 10 of the example embodiment. For this reason, the electric power steering device 100 that obtains the same effect as the motor 10 can be obtained.

The present disclosure is not limited to the above example embodiment. For example, as will be described below, the configuration or the like can be changed without departing from the scope of the present disclosure.

The shapes of the magnets 23a, 23b and the magnetic portion 24 are not limited to the examples described in the above example embodiment. The shapes of the first magnet 23a and the second magnet 23b may be different from each other. For example, a sum of the radial thickness of the first magnet 23a and the radial thickness of the magnetic portion 24 may be equal to the radial thickness of the second magnet 23b. In this case, a radial gap between the rotor 20 and the stator 30 opposed to the rotor 20 from the radial outside can circumferentially and axially be equalized.

Instead of or while providing the resin mold 26 on the rotor 20, the flat surface 22a, the magnets 23a, 23b, and the magnetic portion 24 that contact radially with one another may be fixed to one another by bonding or the like.

Figure 9:
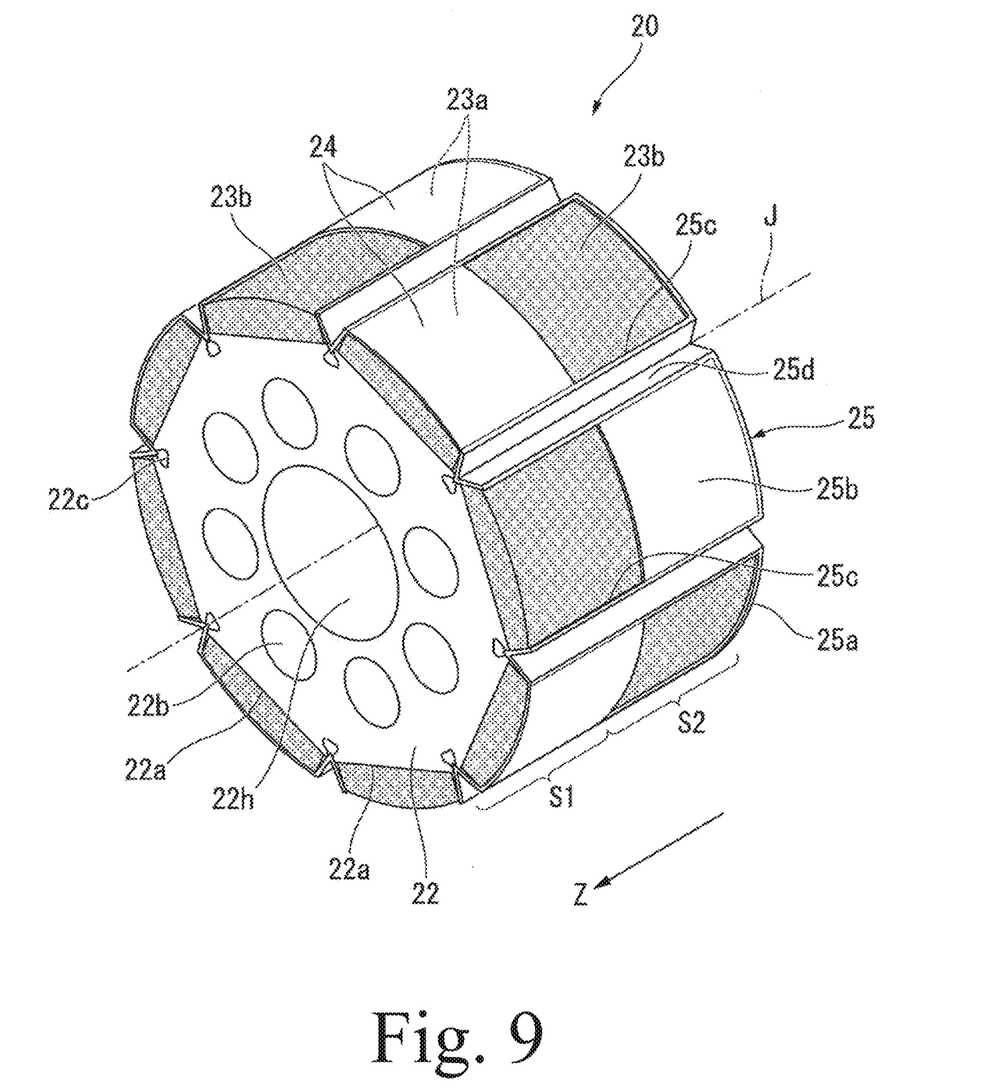
FIG. 9 is a perspective view illustrating a rotor according to a modification of an example embodiment of the present invention.

FIG. 9 illustrates a modification of the cover 25 of the rotor 20 described in the example embodiment. The rotor 20 includes one cover 25. The cover 25 is attached to the rotor core 22 from the other side (lower side) in the axial direction toward one side (upper side). The cover 25 includes the bottom wall 25a, the circumferential wall 25b, and a pillar 25d. The pillar 25d extends axially from the outer periphery of the bottom wall 25a. When viewed in the radial direction, the pillar 25d is disposed so as to overlap the groove 22c. The pillar 25d is disposed on the radial outside of the groove 22c, and extends over the entire length in the axial direction of the groove 22c. The pillar 25d is disposed between the pair of magnets 23a, 23b circumferentially adjacent to each other. The pillar 25d supports the magnetic portion 24 from the circumferential direction. In the illustrated example, the pillar 25d has a plate shape. The pillar 25d includes a V-shaped section perpendicular to the center axis J. According to this modification, the number of components can be decreased, which further facilitates manufacturing. The cover 25 may not include the bottom wall 25a. In this case, the circumferential wall 25b and the pillar 25d are fixed to the rotor core 22 by another fixing means.

In the above example embodiment, by way of example, the first portion S1 and the second portion S2 are axially arranged one by one on the radial outside surface of the rotor core 22. However, but the disclosure is not limited to the example. A total of three of at least one first portion S1 and at least one second portion S2 may axially be arranged on the radial outside surface of the rotor core 22. As described above, even in the case that the total of three of the first portion S1 and the second portion S2 are axially arranged, the above effects can also be obtained. In this case, one or two sets of the first magnet 23a and the magnetic portion 24 that are radially laminated are disposed per one row in the total of three of the first portion S1 and the second portion S2.

Although the example in which the motor 10 is mounted on the electric power steering device 100 is described in the above example embodiment, the present disclosure is not limited to this configuration. The motor 10 can be used for various devices such as a pump, a brake, a clutch, a vacuum cleaner, a dryer, a ceiling fan, a washing machine, and a refrigerator.

Without departing from the scope of the present disclosure, the configurations (components) described in the above example embodiment, modification, and explanatory notes may be combined, and additions, omissions, substitutions, and other changes of the configurations can be made. The present disclosure is not limited by the above example embodiment, but is limited only by the scope of the claims.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A rotor comprising:
    a shaft with a center axis;
    a rotor core fixed to the shaft;
    magnets circumferentially and axially arrayed on a radial outside surface of the rotor core; and
    sheet-shaped magnetic portions provided on radial outside surfaces of predetermined ones of the magnets; wherein
    the magnets include:
        first magnets in which the magnetic portion is on at least a circumferential portion in a radial outside surface of the first magnets; and
        second magnets in which the magnetic portion is not on a radial outside surface of the second magnets;
    the first magnets and the second magnets are alternately arranged in the circumferential direction in a first portion along the axial direction in the radial outside surface of the rotor core;
    the first magnets and the second magnets are alternately arranged in the circumferential direction in a second portion different from the first portion along the axial direction in the radial outside surface of the rotor core; and
    when viewed in the axial direction, the first magnets of the first portion and the second magnets of the second portion overlap each other, and the second magnets of the first portion and the first magnets of the second portion overlap each other.

2. The rotor according to claim 1, wherein when viewed in the axial direction:
a center portion in the circumferential direction of the first magnets of the first portion and a center portion in the circumferential direction of the second magnets of the second portion overlap each other; and
a center portion in the circumferential direction of the second magnets of the first portion and a center portion in the circumferential direction of the first magnets of the second portion overlap each other.

3. The rotor according to claim 1, wherein when viewed in the axial direction:
two ends of the first magnets of the first portion in the circumferential direction and two ends of the second magnets of the second portion in the circumferential direction overlap each other; and
two ends of the second magnets of the first portion in the circumferential direction and two ends of the first magnet of the second portion in the circumferential direction overlap each other.

4. The rotor according to claim 1, wherein
one of the first magnets of the first portion and one of the second magnets of the second portion that are axially arranged define portions of a single structure; and
one of the second magnets of the first portion and one of the first magnets of the second portion that are axially arranged define portions of a single structure.

5. The rotor according to claim 1, wherein same numbers of the first portions and the second portions are alternately arranged in the axial direction on the radial outside surface of the rotor core.

6. The rotor according to claim 5, wherein the first portion and the second portion are axially arranged one by one on the radial outside surface of the rotor core.

7. The rotor according to claim 1, wherein a total of three of at least one of the first portion and at least one of the second portion are axially arranged on the radial outside surface of the rotor core.

8. The rotor according to claim 1, wherein the magnetic portion extends over an entire length of a radial outside surface of the first magnet in the circumferential direction.

9. The rotor according to claim 1, further comprising a cover including a portion located on radial outsides of the rotor core and the magnet; wherein
the magnetic portion is a portion of the cover.

10. The rotor according to claim 1, wherein a radial thickness of the first magnets and a radial thickness of the second magnets are equal to each other.

11. The rotor according to claim 1, wherein a sum of a radial thickness of the first magnets and a radial thickness of the magnetic portion is equal to a radial thickness of the second magnets.

12. The rotor according to claim 1, wherein the rotor core includes a hole axially penetrating the rotor core.

13. The rotor according to claim 12, wherein a plurality of the holes are circumferentially provided at intervals in the rotor core.

14. The rotor according to claim 1, wherein
the rotor core includes a groove which is recessed from the radial outside surface of the rotor core toward a radial inside and extends in the axial direction; and
the groove is between a pair of the magnets circumferentially adjacent to each other and is open to a radial outside, and a width of the groove decreases toward the radial outside.

15. A motor comprising:
the rotor according to claim 1; and
a stator opposed to the rotor with a gap in a radial direction.

16. An electric power steering device comprising the motor according to claim 15.

* * * * *